United States Patent
Noa

[15] 3,662,442
[45] May 16, 1972

[54] VERTICAL TURRET MACHINE TOOL

[72] Inventor: Fritz Noa, Rheydt-Odenkirchen, Germany

[73] Assignee: Maschinenfabrik Froriep GmbH, Rheydh/Rheinland, Germany

[22] Filed: July 1, 1969

[21] Appl. No.: 838,236

[30] Foreign Application Priority Data

July 2, 1968  Germany .................... P 17 52 681.7

[52] U.S. Cl. .................................... 29/26, 29/568, 82/2 D
[51] Int. Cl. ........................................... B23q 3/155
[58] Field of Search .................. 29/26, 568; 82/2.4

[56] References Cited

UNITED STATES PATENTS

| | | | |
|---|---|---|---|
| 3,186,267 | 6/1965 | Pabst et al. | 29/26 UX |
| 3,460,412 | 8/1969 | CLausen et al. | 29/568 X |
| 3,028,770 | 4/1962 | Pittwood | 77/4 |
| 3,186,266 | 6/1965 | Coate | 29/568 X |
| 3,244,037 | 4/1966 | Ruehmer | 82/2 D |

*Primary Examiner*—William S. Lawson
*Assistant Examiner*—Z. R. Bilinsky
*Attorney*—Holman & Stern

[57] ABSTRACT

A vertical turret machine tool having an indexable tool holder store capable of carrying a number of tool holders whereby by suitable indexing of the store, any selected tool holder can be transferred between the store and a movable tool holder mount.

14 Claims, 4 Drawing Figures

INVENTOR
FRITZ NOA

VERTICAL TURRET MACHINE TOOL

This invention relates to machine tools, particularly vertical lathes and vertical boring mills of a type lathes, comprising an horizontal faceplate mounted on a base and with at least one slide rest which is horizontally adjustable on a guide member (such as a cross-rail or frame) and a vertically slidable tool holder mount such as a slide or ram having a receiver for a tool holder.

In a machine of this type in order to permit a plurality of machining operations to be carried out with different tools on the same workpiece, the tool holder mount is usually provided with a turret head which may receive four or five tools. For the requirements of modern manufacturing techniques this necessarily limited number of tools is in many cases not sufficient. This applies particularly in the case of numerical control, increasingly used in vertical turret machine tools. For the machining of a workpiece with these machine tools it is often necessary to use 10 or more different tools.

An object of this invention is to provide a machine tool having means whereby a large number of different tools can be selectively employed in a convenient manner.

The invention accordingly provides a vertical turret machine tool comprising a faceplate mounted on a base, a guide member, a slide rest horizontally adjustably mounted on the guide member, and a tool holder mount vertically slidably mounted on the slide rest, said tool holder mount having a receiver for a tool holder, the machine tool being characterized by a tool magazine carried by the guide member, the tool magazine having a rotatable tool store with a number of store stations, the store being located to permit each store station to be selectively brought to a position in the range of movement of the tool holder mount through suitable rotational positioning of the store for the transfer of a tool holder between a store station and said receiver.

In this type of construction a large number of tools, compared with a turret head as hitherto customarily used, can be made available directly on the machine itself, and through the arrangement of the magazine according to the invention, tool changing can be effected in a relatively simple manner. For this purpose two rectilinear movements of the slide rest and tool holder mount, preferably in the form of a slide or ram, carried by the rest, which movements are normally provided on such a machine tool, can be used. This is made possible through a fixed dimensional relationship between the tool magazine and the guide member on or over which the slide rest moves. The storage device of the magazine need perform only rotational movement in order in each case to bring the desired store station into the angular position which is the so-called second predetermined position provided as transfer or change position. Otherwise the tool magazine has no movements to perform.

In the case of a machine tool having a vertically adjustable cross-rail and guides provided on the latter for the slide rest, a stationary part or housing of the magazine may be disposed on said cross-rail. If on the other hand the machine has a stationary cross-rail or a frame or pillar with slide rest guides which for example are disposed horizontally, that is to say substantially in a horizontal plane, the tool magazine may be disposed on this stationary cross-rail or frame or on this pillar.

In a numerically controlled vertical lathe or vertical boring mill of the abovedescribed type, and also in a single-column vertical turret lathe, the movement of the slide rest and the movement of the slide or ram are movements which in all cases can be numerically controlled. The entire tool change in a machine of this type can therefore be included in the numerically controlled work cycle without substantial additional expense.

Whereas the use of a turret head necessitated a wide slide on the slide rest, through the invention it is now possible to use a relatively slender slide or ram of a box-shaped cross-section or prismatic cross-section. The machining of bores is thereby facilitated, because the slide or ram can penetrate into the bore with diverse tools themselves and in certain cases without a boring bar, such as was hitherto needed.

In a machine tool according to the invention external transport for the tool holders to be changed is not required and no additional gripper, transfer, and conveying means are needed. In a large vertical machine tool in which the tool holders are correspondingly heavy, this generally facilitates tool changing. In other machine tools, known transfer and transport devices for changing tools are not suitable or necessary for the purposes of the invention.

The construction of the tool magazine with the store may be such that the tool holders can be removed from the store, and returned to the latter, by a movement of the tool holder mount, either together with the slide rest, or relatively to the slide rest which movement may be directed transversely or parallel to the axis of rotation of the store.

When a vertically adjustable cross-rail is provided, the tool magazine is advantageously held by an arm fastened on the bottom and/or the back of the cross-rail. This is a construction which does not impair the construction of the slide rest guides, and which in addition permits without difficulty the subsequent fitting of a tool magazine in an existing machine.

According to another feature of the invention, an adjustable friction clutch may be provided between the store of the magazine and a sleeve which is adapted to be driven rotationally by means of a motor. This provides security against overload and damage, and in addition, in conjunction with means for accurately securing the store in the various angular positions, means that precise switching-off of the rotary drive for the store need not be provided, but that a certain running-on of the drive can be permitted.

For the purpose of adjusting the friction clutch, there may be provided a central bolt disposed in the center of the tool magazine housing, which bolt is non-rotatable in relation to the housing but is axially adjustable, and a spring disposed in driving relation between the central bolt and the friction clutch.

The central bolt may be hollow, so that an operating member for a decoding switch, which member is adapted to rotate with the store can pass through the bolt. The decoding switch has a number of contact combinations associated with the individual store stations respectively. Depending on which store station is situated in the transfer position or in the change position, predetermined contacts are closed which permit a signal to be returned indicating that a preselectable store station has reached this position.

In order to secure the store accurately in the required angular position, a servo-operated conical locking bolt may be provided on the housing of the magazine, and the store may have for the purpose of receiving the locking bolt a number of conical sockets corresponding to the number of store stations. The locking bolt is advantageously spring loaded and is operated electromagnetically through a sequence control. A safety switch operating in dependence on the movement of the bolt is advantageously provided. This safety switch permits the triggering of a function in the course of the operation only when the locking bolt is in the correct position.

According to another feature of the invention there are preferably provided, at the store stations and on the tool holders, positive engagement transfer elements intended for assuring the accurate transfer and positioning of tool holders in the store stations. The arrangement may for example be such that each tool holder is provided at a predetermined location with a recess which is engaged by an extension, projection, wedge, or the like on the store station. This generally ensures the correct insertion of the tool holders into the store stations, in respect of angular orientation.

In order to protect the tool holders contained in the store, as well as the tools, against chips and dirt, the store may have a cover hood which is rotatable by means of a drive and which is provided with an opening to allow for the transfer of tool holders. The drive may be included in the automatic circuit for the tool change operation.

The invention will now be described by way of an example with reference to the accompanying drawings in which.

Figure 1:
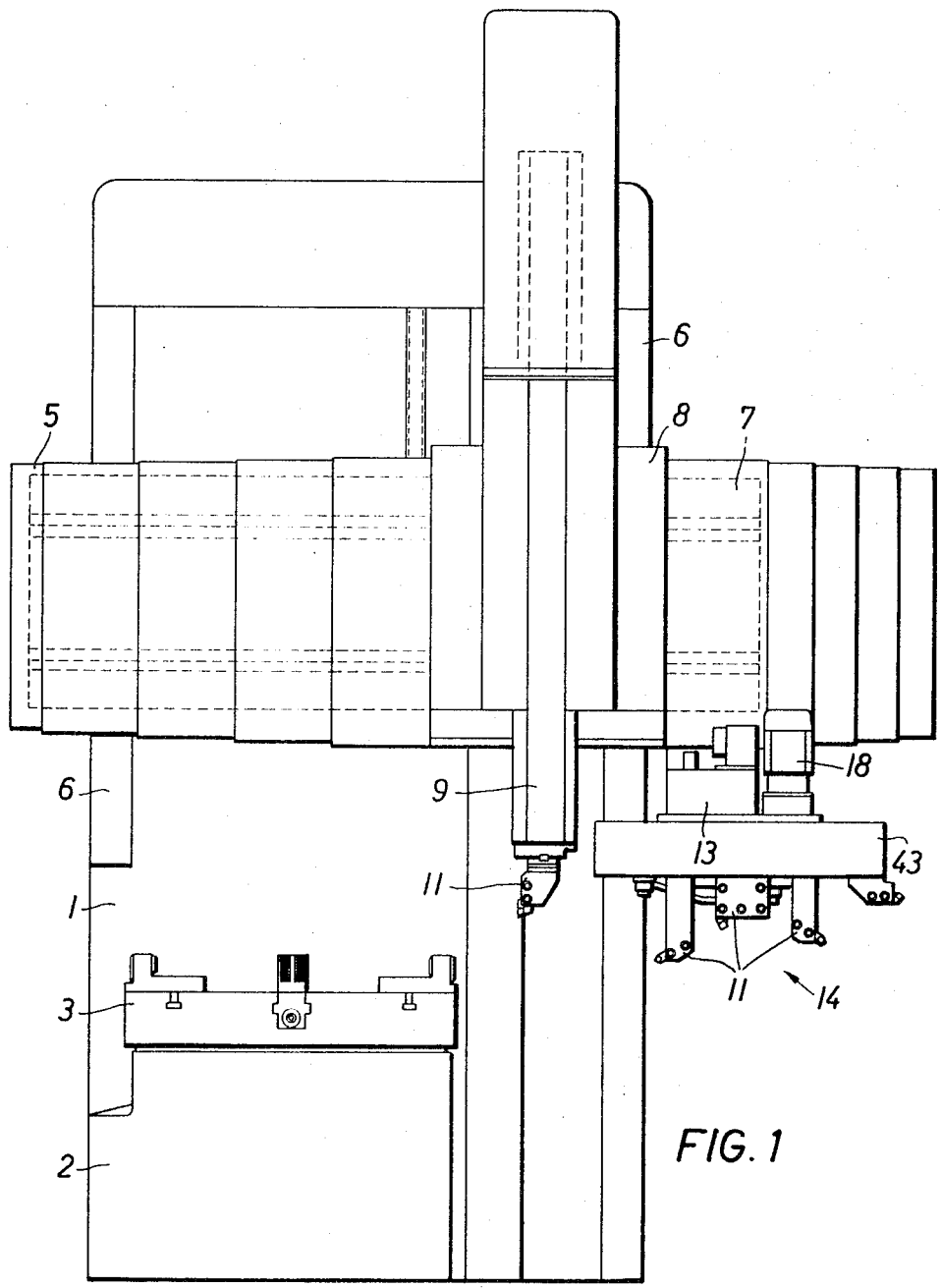
FIG. 1 is a front elevation of a single-column vertical lathe constructed in accordance with the invention.
Figure 2:
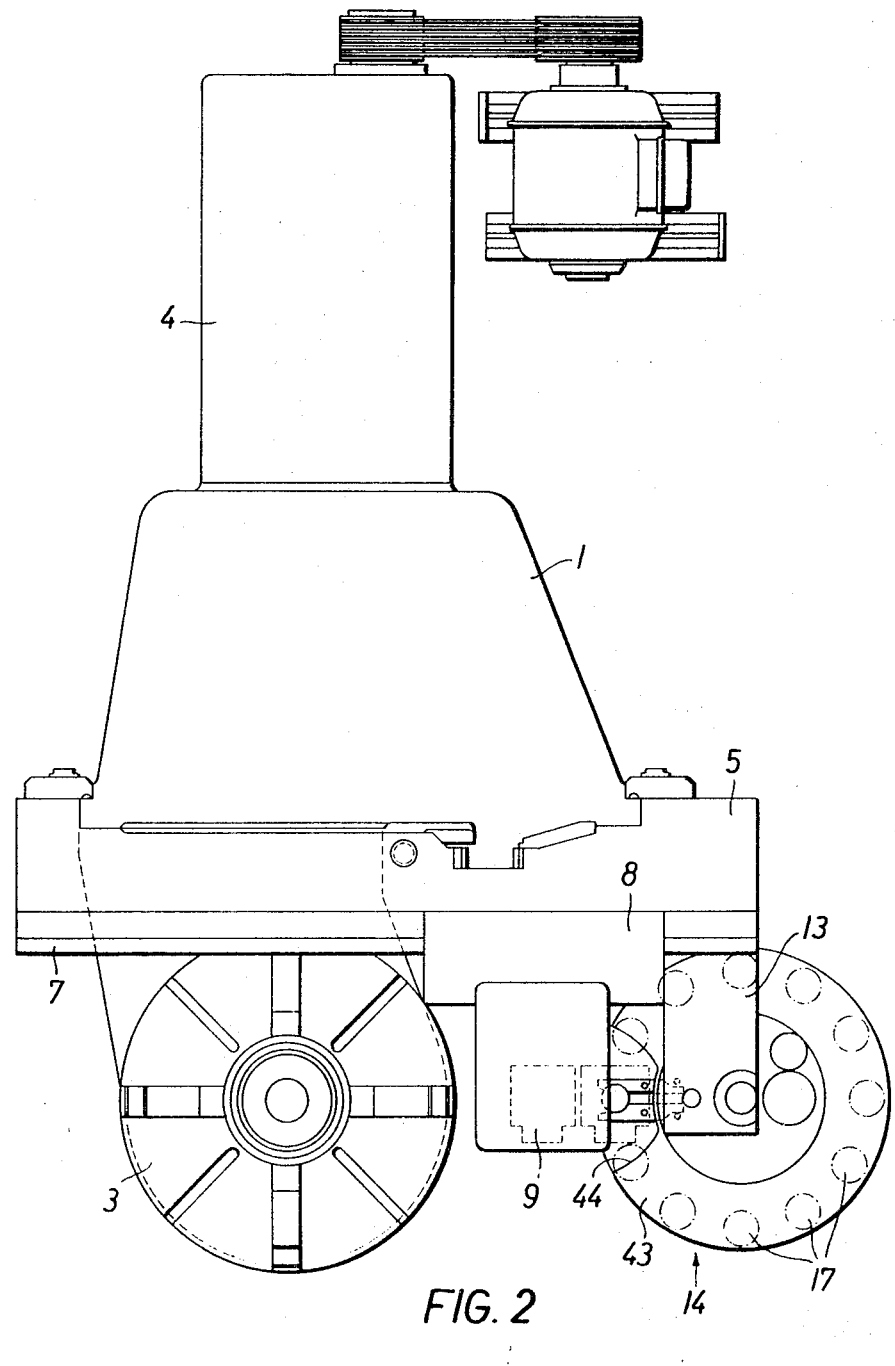
FIG. 2 is a top view of the lathe, omitting the cross-rail guides cover.
Figure 3:
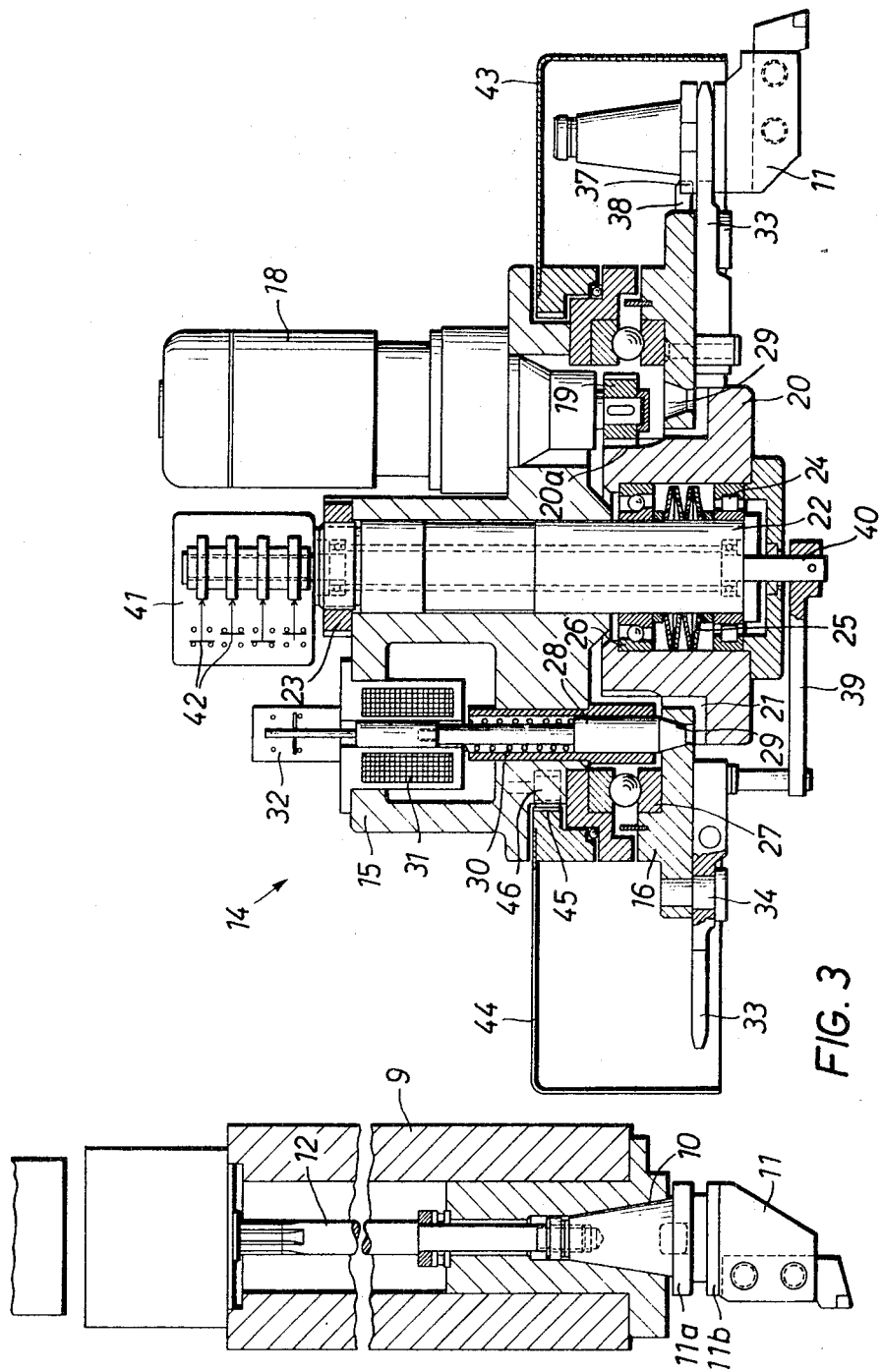
FIG. 3 is an enlarged vertical section through the lathe tool magazine and part of the slide.

The machine illustrated in FIGS. 1 and 2 is a numerically controlled vertical lathe, which has a column 1 and a base 2 with a faceplate 3 mounted thereon. Reference 4 designates the main drive, which is disposed outside the column (FIG. 2). A cross-rail 5 of the machine is vertically adjustable on vertical guides 6 on the column 1 and is provided with guides 7 for a horizontally slidable slide rest 8. The latter carries a vertically adjustable tool holder mount in the form of a ram 9, which at its bottom end is provided with a conical tool holder receiver socket 10 (FIG. 3). The ram 9 also contains an electric clamping drive for tool holders 11, with a rotatable, axially slidable clamping bar 12, the bottom threaded end of which is adapted to engage in the threaded bore of the respective tool holders.

On the bottom of the cross beam 5 there is fastened an arm 13, which carries a tool magazine designated generally by the reference 14. This magazine includes a housing 15 and a rotatable storage device or store 16, which is in the form of a disc and has for example 12 store stations 17 for the tool holders 11. A controllable electric motor 18 serves for the rotational drive of the store 16. A pinion 19 mounted on the output shaft of said motor meshes with a toothed rim 20a provided on a sleeve 20. The sleeve 20 is provided with a bush 21 which has an angular cross-section and receives the store and which at the same time forms a friction clutch between the sleeve 20 and the store 16. This friction clutch is adjusted by a central bolt 22, which can be displaced in the axial direction by means of a nut 23 in relation to the housing 15 of the magazine. The bolt 22 is guided in a central bore in the housing 15 by means of a wedge or the like so as to be incapable of rotation. The upwardly directed force produced on the tightening of the nut 23 is transmitted through the collar at the bottom end of the central bolt 22, through the inner ring of a radial roller bearing 24, through a packet of plate springs 25, and through an annular shoulder ball bearing 26 to the sleeve 20 and thus to the bush 21.

The disc-shaped store 16 frictionally connected to said bush is supported in relation to the housing 15 by an axial rolling contact bearing 27.

The exact angular positioning of the store 16 in various positions is effected by a locking bolt 28 having a conical end and adapted to be inserted into correspondingly conical sockets 29 provided in the store and associated with the store stations. The locking bolt 28 is acted on by a spring 30 urging it in the direction of the store and can in each case be raised by an electromagnet 31. Its upper end is associated with a safety switch 32 which prevents the triggering of other functions if the locking bolt is not in the correct position.

Figure 4:
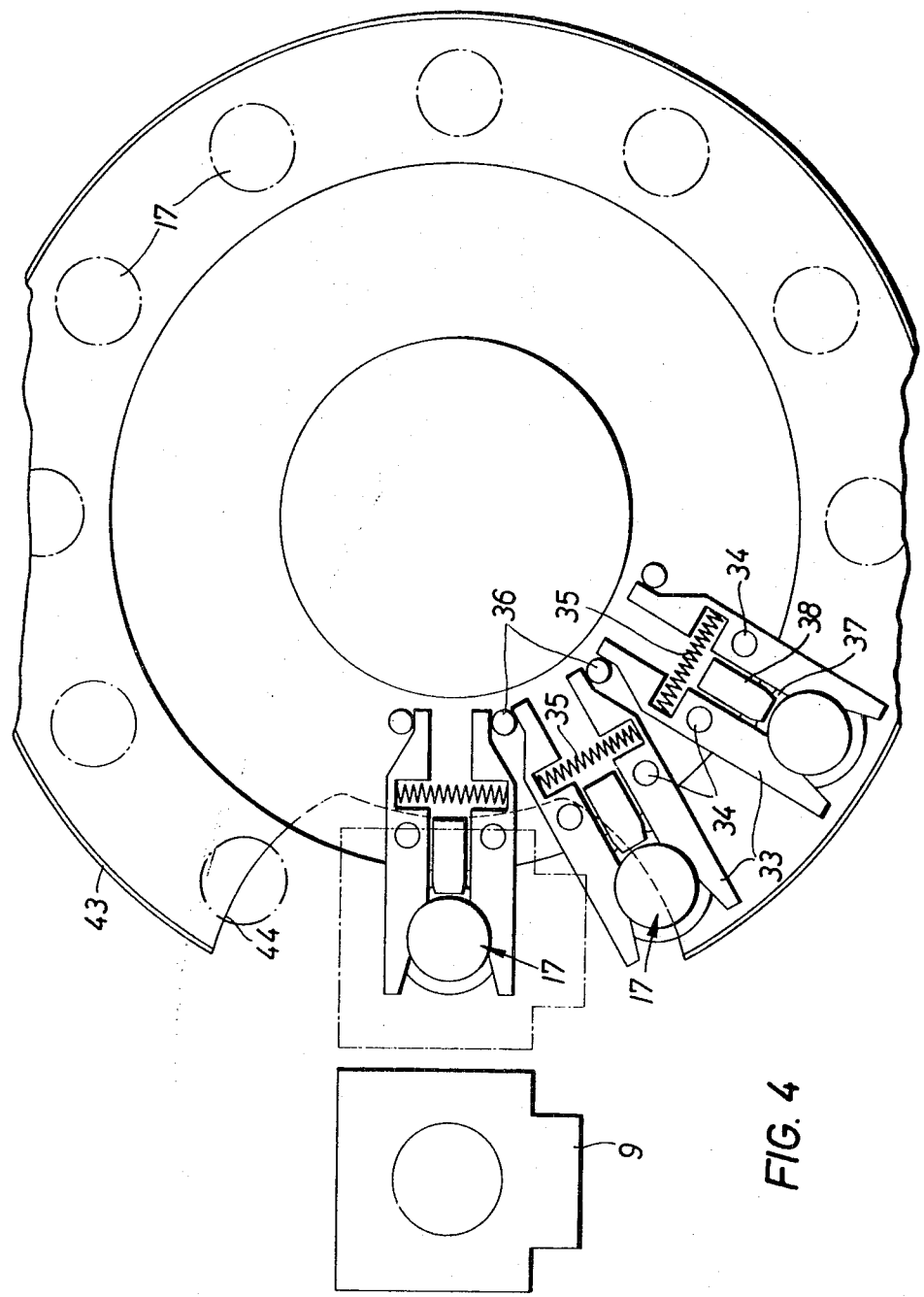
FIG. 4 is a simplified enlarged horizontal section through the magazine with a plan view of the store, various parts being omitted for the sake of clarity.

For the purpose of receiving the tool holders 11 in the store station 17, use is made of grippers 33 the arms of which are pivotal about pins 34 and which near their inner ends are loaded by springs 35, so that their front or outer ends can be moved towards one another. Reference 36 designates stops for the inner ends of the gripper arms. The grippers 33 receive the tool holders 11 in each case by their arms engaging between two annular collars 11a, 11b on a tool holder. The upper annular collar of each tool holder 11 is provided at a predetermined point on its periphery with a recess 37 which is engaged by an extension 38 on the respective store station 17 (see FIG. 4). It is thereby ensured that each tool holder can be inserted into the store station only in the correct angular orientation. By similar means the correct position of the tool holders in the ram 9 is ensured.

The rotatable store 16 is acted on by a lever 39 (FIG. 3), which is attached to an operating member 40 for a decoding switch 41, the operating member passing through the hollow central bolt 22 and being rotatably mounted therein. The individual contacts 42 of said switch are operated by cam discs in various combinations, depending on which store station 17 is situated at the transfer point. It is thereby possible for any desired tool holder to be selected in advance from the number available. As soon as this tool holder reaches the transfer position in the course of a rotation of the store 16, a signal is sent back through the decoding switch 41 and is used to switch off the rotational drive 18.

The store 16 is provided with a cover 43, which has a cutout 44 and which by means of a motor (not illustrated) can be rotated through a pinion 46 meshing in the toothed rim 45.

The tool magazine 14 including the store 16 is so disposed that in every prescribed angular position of the latter, a store station is situated within the range of movement of the ram 9. It is particularly advantageous for the arrangement to be such that this transfer position corresponds to the position of the slide rest 8 for the maximum turning diameter of the machine tool, while the vertical position is determined by a fixed distance from the cross-rail 5 corresponding to a predetermined position of the ram 9 in relation to the slide rest 8.

A tool change is effected as follows:

Through a command from the numerical control of the machine, the slide rest 8 and ram 9 are brought into a starting position for the change operation and from this position the ram 9 is moved on the slide rest 8 so that the tool holder 11 situated in the ram is brought to the same height as the gripper 33 of the empty store station 17 which is positioned ready to receive it. In addition, the cover 43 is turned by means of its drive so that its cutout 44 comes to lie at the position of the empty store station, that is to say at the transfer position. The slide rest 8 now travels in the direction of the magazine 14, so that the tool holder 11 is transferred to the store 16 and thus gripped by the respective gripper 33. The tool holder 11 is then released from the ram 9, and the clamp bar 12 is unscrewed from the tool holder. Immediately thereafter, for example with a time lag adjustable by means of a time relay, the ram 9 moves slightly upwards in order to free the cone of the tool holder 11. The store 16 of the magazine is now turned until the desired new tool holder is situated at the transfer point. The ram 9 then moves downwards, the tool holder 11 is clamped, and the slide rest 8 together with the ram 9 moves away from the magazine to a starting position for the slide rest and ram, from which the new machining operation starts. In addition, the cover 43 on the magazine is now turned again so that its cutout 44 is remote from the machining position.

The entire change operation requires only a few movements and can be carried out in a relatively simple manner with the means of a sequence control, program control, or numerical control.

I claim:

1. A vertical machine tool comprising:

a base;

a horizontal faceplate mounted on said base;

a guide member having horizontal guide means;

means by which said guide member is supported on said base;

a slide rest mounted on said guide member and engaging said horizontal guide means so as to be horizontally movable relative to said guide member, said slide rest having vertical slide means;

a tool holder mount mounted on said slide rest and engaging said vertical slide means so as to be vertically movable relative to said slide rest, said tool holder mount having receiver means to receive a tool holder;

means for controllably moving said slide rest horizontally relative to said guide member and means for controllably moving said tool holder mount vertically relative to said slide rest whereby said tool holder mount can be positioned at a first predetermined position relative to said guide member;

a tool magazine mounted on said guide member, said tool magazine including a tool storage device which is rotatable about a fixed axis relative to said guide member, said tool storage device including a plurality of store stations distributed around said axis such that any selected store station can, by mere rotation of said tool storage device, without axial movement of said tool storage device, be positioned at a second predetermined position relative to said guide means, said second predetermined position being juxtaposed with said first predetermined position;

a plurality of tool holders removably carried by said tool storage device at respective ones of said store stations; and means selectively operable when the tool holder mount and a selected store station are at said first and second predetermined positions respectively to cause said receiver means to engage a tool holder which is being carried by said tool storage device at the selected store station, to remove the tool holder from said tool storage device and to replace the tool holder thereat;

said tool storage device being rotatable while said tool holder mount is positioned at said first predetermined position to move different store stations to said second predetermined position without axial movement of said tool storage device.

2. A machine tool according to claim 1, characterized by tool holder-gripper means mounted on the storage device enabling a tool holder to be transferred between a tool holder station and said receiver by movement of the tool holder mount in a direction transverse to the axis of rotation of the storage device.

3. A machine tool according to claim 1, characterized by tool holder-gripper means mounted on the storage device enabling a tool holder to be transferred between a tool holder station and said receiver by movement of the tool holder mount in a direction parallel to the axis of rotation of the storage device.

4. A machine tool according to claim 1, characterized in that the guide member is vertically adjustable cross rail and an arm fastens the tool magazine to the cross rail.

5. A machine tool according to any claim 1, characterized in that the tool magazine is provided with a drive sleeve, means for rotating the drive sleeve and an adjustable friction clutch between the store and the sleeve.

6. A machine tool according to claim 5, characterized in that the tool magazine comprises a housing, adjusting means for the friction clutch comprising a non-rotatable, axially adjustable bolt disposed in the center of the housing of the tool magazine and a spring drivingly connected between the bolt and the friction clutch.

7. A machine tool according to claim 6, characterized in that a decoding switch is adapted to produce electrical signals representative of the rotary position of said storage device and in that the bolt is hollow and an operating member for said decoding switch passes through the bolt, said operating member being adapted to rotate with the storage device.

8. A machine tool according to claim 1, characterized in that said tool magazine includes a housing and in that on said housing of the tool magazine there is provided a servo operated conical locking bolt and the storage device is provided with a number of conical sockets for the locking bolt corresponding in number to the number of store stations.

9. A machine tool according to claim 8, characterized in that the locking bolt has a safety switch associated therewith, the switch being adapted to be operated through movement of the locking bolt.

10. A machine tool according to claim 1, characterized by positive engagement transfer elements associated with the tool receiver means and each store station respectively to provide accurately located tool holder transfer between a store station and the tool receiver means.

11. A machine tool according to claim 1, characterized in that the tool magazine is provided with a rotatable cover, a drive for the cover, and means defining an opening in the cover permitting the transfer of tool holders between the storage device and the receiver means.

12. A machine tool according to claim 1, wherein the machine tool comprises a vertical lathe.

13. A machine tool according to claim 1, wherein the machine tool comprises a vertical boring mill.

14. A machine tool according to claim 1 characterized in that the selectively operable means is adapted to move the tool holder mount in said first predetermined position.

* * * * *